May 5, 1931.　　　　J. NADEAU　　　　1,803,401
RIGGING HOOK
Filed July 30, 1930　　2 Sheets-Sheet 1

INVENTOR
Joseph Nadeau
BY
ATTORNEY

May 5, 1931.                J. NADEAU                1,803,401
                            RIGGING HOOK
                   Filed July 30, 1930    2 Sheets-Sheet 2

INVENTOR
Joseph Nadeau
BY
ATTORNEY

Patented May 5, 1931

1,803,401

UNITED STATES PATENT OFFICE

JOSEPH NADEAU, OF PORTLAND, OREGON

RIGGING HOOK

Application filed July 30, 1930. Serial No. 471,724.

My invention relates to logging operations and particularly to the connecting elements in the rigging by which ends of the latter are connected together. Towards this end, my invention is intended as a development and improvement over United States Patent No. 1,391,457, granted September 20, 1921, to myself and to John A. Buckley. In such patent we propose to modify the type of choker hooks and butt hooks as described in the prior art by arranging the aperture for the ferruled or knob-like end in a plane normal to the plane of the seat, so as to require the end of the cable to be inserted endwise into the hook and then to be turned so as to extend parallel to the general dimensions of the hook to be seated. This tends to prevent the inadvertent disengagement of the ferruled end of the cable with such hook. This type of hook is generally practical but upon infrequent occasions the ends of the rigging do become disengaged, especially so if they are not maintained taut by a log, such, for example, as when the choker lines are being sent back to the woods empty.

The object of my invention is to provide a hook of this character in which the ferruled end can be slipped sidewise into place, thus to eliminate the necessity of providing additional slack which is required to permit the ferruled end of the rigging to be inserted endwise into the hook. I attain this object by providing a keeper, the lower or free end of which when arranged in operative position defines an entrance to the chamber adjacent the shoulder insufficient to permit the knob-like end to become unseated therefrom. Such keeper is arranged in operative position by a yielding element, such for example as a spring and to be moved into disengaging position some external force must be applied to oppose such yielding means. To prevent the inadvertent movement of such keeper from operative position, the latter is housed in on three sides by the body of the hook and on the remaining side faces the entrance aperture to such hook.

A further object of my invention is to provide a keeper of this character which, when arranged in operative position, abuts endwise against the side walls of the casing, so that when struck by the knob-like end of the cable transmits such blow directly to the side walls of the casing, rather than to the transverse pin upon which such keeper is rotatably mounted.

Further details of construction and the mode of operation are hereinafter described with reference to the accompanying drawings, in which.

My improved hook is shown as embodied in a butt or bull hook comprising a one-piece cast body $a$, the upper end of which is formed into an eye $b$ and the lower half into a lateral shoulder $c$. Such body is hollowed out, the interior chamber $d$ being substantially circular in section and slightly larger than the diameter of the ferruled end $e$ of the wire rope or cable $f$, which end is adapted to be accommodated within such chamber. The entrance aperture $g$ into such chamber $d$ opens outwardly and is preferably formed so as to be slightly larger than the longitudinal cross-section of the ferruled end $e$ of the cable, so as to permit such end to be moved into and out of such chamber sidewise.

Figure 1:
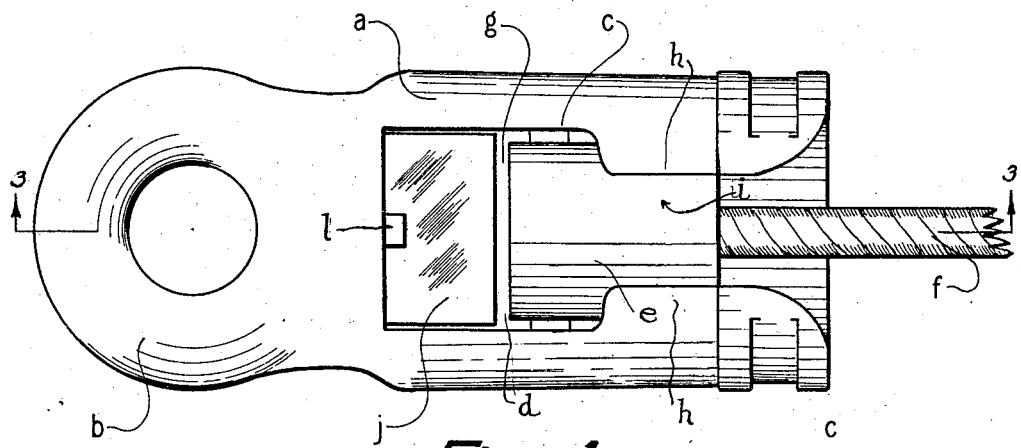
Fig. 1 is an elevation of such hook looking into the entrance aperture.
Figure 2:
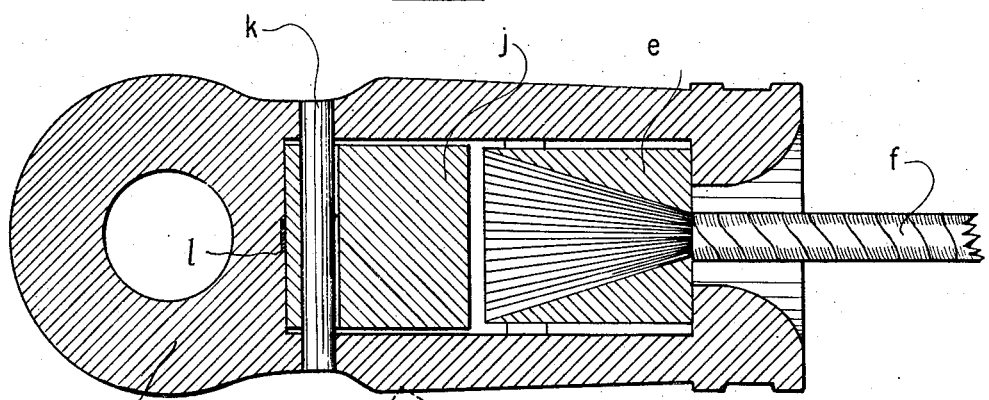
Fig. 2 is a sectional view taken on the line 2—2 in Fig. 3.
Figure 3:
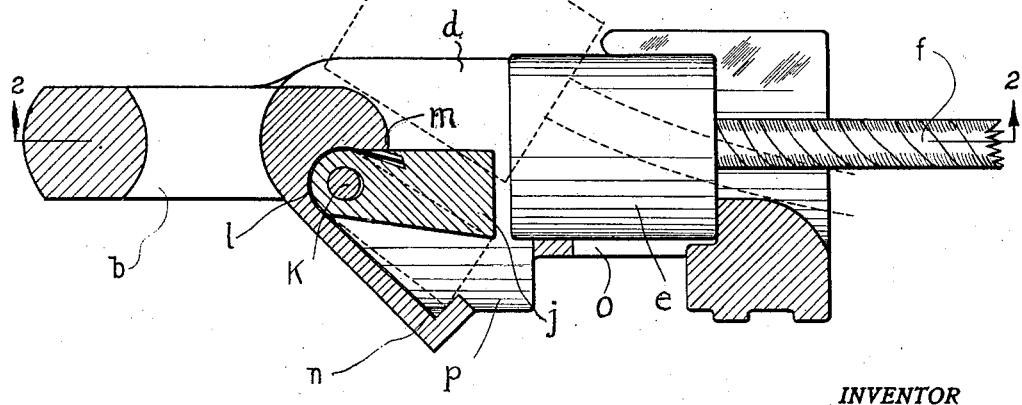
Fig. 3 is a longitudinal sectional view taken on the line 3—3 in Fig. 1.

The portions of such body immediately adjacent the slot $i$ form outstanding ears $h$ and are proportioned so as to accommodate and engage the ferruled end of the cable in a temporary sort of way, the purpose of which will be hereinafter described more in detail. Extending endwise into such interior chamber is a pivoted pawl or keeper $j$ arranged so that the lower end thereof extends in registration with the entrance aperture $g$ and such pawl extends wholly within the lateral boundaries of the hook body. Such pawl is arranged so as to extend substantially in vertical alinement with the lateral shoulder c, as is shown in Figs. 1 and 2, so that when the ferruled end of the cable is arranged in position the free end of such pawl or keeper is substantially in alinement therewith, so that if the ferruled end is forced upwardly from off its seat it will strike the end of the pawl a straight, compressive blow. Such pawl or keeper is loosely mounted for pivotal action upon a lateral pin k extending thru such hook body adjacent the eye b. A spring or other yieldable means l yieldingly holds the pawl or keeper j in abutment with a stop m. For the purpose of ease in assembly and removal, such spring preferably is a formed, flat-leaf spring, one portion l' of which encircles and engages the upper or pivoted end of the keeper.

The lower end engages the side wall of the hook body immediately adjacent an inwardly extending shoulder n. Adjacent such shoulder the portion of such body defining the spring chamber or housing is cut away forming a port or ports p, so as to permit dirt or other foreign materials which might pass into such chamber along the sides of the pawl to escape and be discharged so as to insure the proper operation of such pawl. Immediately thereunder also is a lightening hole o which serves no function only to lighten the hook by removing excess material. Such hole is not sufficiently large to permit the ferruled end of the cable to pass therethru.

The portion of the hook body adjacent the upper end of the pawl or keeper is proportioned so as to form virtually a cam face with which such face the upper end of the keeper is adapted to abut when the latter is arranged in active retaining position. Sufficient play is provided between the keeper and the pin k so that when a blow is struck upon the free end of the keeper by the ferruled end of the cable such blow is transmitted directly to the body and such blow is not sustained by the pin because of such excess play. In the drawings the degree of play is exaggerated slightly so as to illustrate this feature more clearly.

The portions of the body adjacent the pawl, when arranged in depressed or inactive position, are formed so as to be in parallelism with, and in close proximity to, the sides of such keeper, so as to eliminate dirt and other foreign materials from passing between such two opposed parts and into the spring chamber. As has been pointed out heretofore, the portions of the hook body adjacent the shoulder n are removed to provide a port or ports p extending away from the eye b, so as to permit such foreign materials to escape from the spring housing into the chamber. This is true inasmuch as the hook is generally lifted by some agency connected to the eye thereof and such hook generally extends in a vertical plane so that such port or ports extending away from the eye are arranged in more or less of a vertical plane. The hook usually is violently shaken about in operation and thus such ports prevent the accumulation of any foreign materials behind the keeper which would render the operation of the latter inefficient. Although my invention is shown as incorporated in a so-called butt or bull hook, I do not wish it so limited as it has substantial utility in connection with so-called choker hooks which differ from the butt hooks in specific design and the eye is formed into a sleeve of greater length than is shown in the drawings.

The operation of my device is as follows: Considering my invention as embodied in a butt hook, the latter is moved into approximate position by the operator of the rigging. The ferruled end of the choker to be engaged thereby is brought into lateral registration with the entrance aperture g. If insufficient slack is provided in the rigging for easily fastening such choker to the butt rigging, the effective use of the motive power of the rigging can be used for moving such parts together by arranging the inward shouldered end of the ferrule upon the ears h and drawing the choker end therewith. Then by slackening off of the rigging the slack thus obtained is sufficient to permit the connection of the parts.

As is shown in dotted lines in Fig. 1, the body slot and pawl are arranged so that by arranging the cable with its knob-like end at an angle the engagement can be made by pulling the parts together by a straight line pull and the keeper will be returned into operative position by its spring. Disengagement of the parts is permitted by depressing the keeper, inserting the fingers of one hand thru the aperture g and rotating the free end of the keeper inwardly from such aperture so that the end of the knob-like end of the cable can be forced past the keeper and by a continued movement outwardly of such end the keeper will permit disengagement of such parts.

Figure 4:
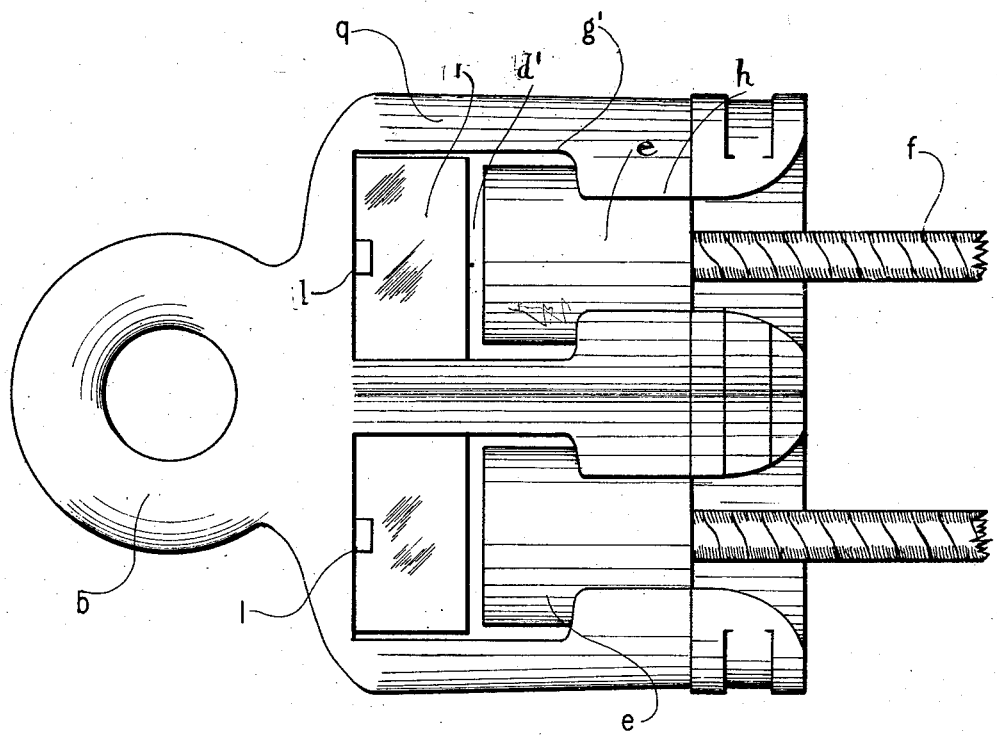
Fig. 4 is an elevation corresponding to Fig. 1 of a hook of the multiple type.
Figure 5:
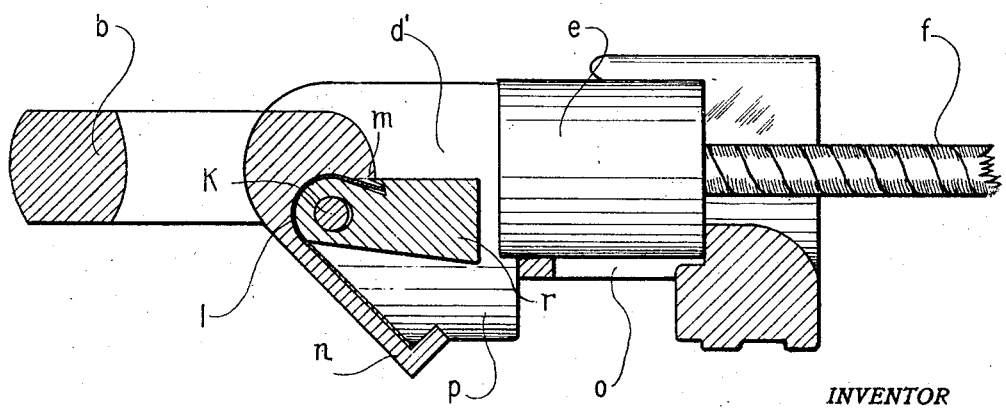
Fig. 5 is a sectional view taken in a plane corresponding to that of Fig. 3, also thru a hook of the multiple type.

In Fig. 4 I have shown my invention as embodied in a multiple type of hook, that is, one in which the hook is adapted to receive and retain the ends of two separate pieces of rigging. The parts are arranged so that such pieces of rigging can be secured to such hook and detached therefrom independently of each other. To this end the cast body q of the hook is provided with two interior chambers d' arranged side by side and each chamber is adapted to receive and hold the ferruled end e of the wire rope cable f. Each chamber is provided with a separate entrance aperture g', as in the single type of hook shown in the first-mentioned figures. The multiple chambers, however, are preferably controlled by a single pawl or keeper r, which spans both or all of the chambers. In other details the two modifications are similar and the modification shown in Fig. 4 will not thus be described in further detail. Although a multiple type hook having two receiving apertures is shown, it is apparent that as many apertures can be provided as is desirable and thus the modification shown in such Fig. 4 is merely illustrative of my invention as embodied in a hook of this character having more than one ferrule receiving chamber.

I claim:

1. A logging hook comprising a hollow body defining an interiorly-arranged chamber adapted to engage and house the knob-like end of a cable, one end of such chamber defining a seat for such cable end and the other end defining a laterally arranged entrance aperture spaced from such seat, such entrance aperture connecting the interior chamber with the exterior of such body, a restricted longitudinal slot leading from such aperture to such seat and proportioned to pass the cable but to retain the knob-like end thereof, an interiorly-arranged keeper arranged movably and centrally in said body and opposing the seat therein and resilient means engaging said keeper and tending to return and to hold the latter centrally in such chamber.

2. A logging hook comprising a hollow body defining an interiorly-arranged chamber adapted to engage and house the elongated knob-like end of a cable, one end of such chamber defining a seat for such cable end and the other end defining a laterally-arranged entrance aperture spaced from such seat, such entrance aperture connecting the interior chamber with the exterior of such body, such aperture approximating the longitudinal cross-section of the knob-like end of the cable to be accommodated, thereby adapting the latter to be inserted and removed generally sidewise thru such aperture, a restricted longitudinal slot leading from such aperture to such seat and proportioned to pass the cable but to retain the knob-like end thereof, an interiorly-arranged pivotally mounted keeper arranged centrally in said body and opposing the seat therein and resilient means engaging said keeper and tending to return and to hold the latter centrally in such chamber.

3. A logging hook comprising a hollow body defining an interiorly-arranged chamber adapted to engage and house the knob-like end of a cable, one end of such chamber defining a seat for such cable end and the other end defining a laterally arranged entrance aperture spaced from such seat, such entrance aperture connecting the interior chamber with the exterior of such body, a restricted longitudinal slot leading from such aperture to such seat and proportioned to pass the cable but to retain the knob-like end thereof, an interiorly-arranged keeper arranged movably and centrally in said body and opposing the seat therein, a flat-leaf spring engaging said keeper and tending to hold the latter centrally in such chamber, such spring encircling one end of said keeper and the pivotal connection therefor and engaging such keeper at a point where the pivotal connection lies intermediate the end and such point of connection.

4. A logging hook comprising a hollow body defining an interiorly-arranged chamber adapted to engage and house the knob-like end of a cable, one end of such chamber defining a seat for such cable end and the other end defining a laterally arranged entrance aperture spaced from such seat, such entrance aperture connecting the interior chamber with the exterior of such body, a restricted longitudinal slot leading from such aperture to such seat and proportioned to pass the cable but to retain the knob-like end thereof, an interiorly-arranged keeper arranged movably and centrally in said body and opposing the seat therein, yieldable means engaging said keeper and tending to hold the latter centrally in such chamber, one end of such keeper and the interior surface of the body adjacent thereto being formed relatively to define an engaging surface, the mounting for such keeper being loosely made to permit such parts to engage.

5. A logging hook comprising a hollow body defining an interiorly-arranged chamber adapted to engage and house the knob-like end of a cable, one end of such chamber defining a seat for such cable end and the other end defining a laterally arranged entrance aperture spaced from such seat, such entrance aperture connecting the interior chamber with the exterior of such body, a restricted longitudinal slot leading from such aperture to such seat and proportioned to pass the cable but to retain the knob-like end thereof, an interiorly-arranged keeper arranged movably and centrally in said body and opposing the seat therein, yieldable means engaging said keeper and tending to hold the latter centrally in such chamber, an auxiliary chamber arranged adjacent such first-mentioned interior chamber and housed within such body, such auxiliary chamber housing the keeper actuating means.

6. A logging hook comprising a hollow body defining an interiorly-arranged chamber adapted to engage and house the knob-like end of a cable, one end of such chamber defining a seat for such cable end and the other end defining a laterally arranged entrance aperture spaced from such seat, such entrance aperture connecting the interior chamber with the exterior of such body, a restricted longitudinal slot leading from such aperture to such seat and proportioned to pass the cable but to retain the knob-like end thereof, an interiorly-arranged keeper arranged movably and centrally in said body and opposing the seat therein, yieldable means engaging said keeper and tending to hold the latter centrally in such chamber, an auxiliary chamber arranged adjacent such first-mentioned interior chamber and housed within such body, such auxiliary chamber housing the keeper actuating means and a port leading from said auxiliary chamber to the exterior of said body.

7. A logging hook comprising a hollow body defining an interiorly-arranged chamber adapted to engage and house the knob-like end of a cable, one end of such chamber defining a seat for such cable end and the other end defining a laterally-arranged entrance aperture spaced from such seat, such entrance aperture connecting the interior chamber with the exterior of such body, a restricted longitudinal slot leading from such aperture to such seat and proportioned to pass the cable but to retain the knob-like end thereof, a stop located in the upper part of such chamber, an interiorly-arranged pivotally-mounted keeper arranged centrally in said body in substantial axial alinement with such chamber and in the upper end thereof and opposing the seat therein, such keeper being pivotally mounted behind such stop and yieldable means engaging said keeper and tending to hold the latter against such stop.

8. A logging hook comprising a hollow body defining an interiorly-arranged chamber adapted to engage and house the knob-like end of a cable, one end of such chamber defining a seat for such cable end and the the other end defining a laterally arranged entrance aperture spaced from such seat, such entrance aperture connecting the interior chamber with the exterior of such body, a restricted longitudinal slot leading from such aperture to such seat and proportioned to pass the cable but to retain the knob-like end thereof, a stop located in the upper part of such chamber, an interiorly-arranged pivotally-mounted keeper arranged centrally in said body in substantial axial alinement with such chamber and in the upper end thereof and opposing the seat therein, such keeper being pivotally mounted behind such stop, a flat-leaf spring engaging said keeper and tending to hold the latter against such stop, such spring encircling one end of said keeper at a point where the pivotal connection lies intermediate the end and such point of connection.

9. A logging hook comprising a hollow body defining an interiorly-arranged chamber adapted to engage and house the knob-like end of a cable, one end of such chamber defining a seat for such cable end and the other end defining a laterally-arranged entrance aperture spaced from such seat, such entrance aperture connecting the interior chamber with the exterior of such body, a restricted longitudinal slot leading from such aperture to such seat and proportioned to pass the cable but to retain the knob-like end thereof, a stop located in the upper part of such chamber, an interiorly-arranged pivotally-mounted keeper arranged centrally in said body in substantial axial alinement with such chamber and in the upper end thereof and opposing the seat therein, such keeper being pivotally mounted behind such stop, yieldable means engaging said keeper and tending to hold the latter against said stop, one end of such keeper and the interior surface of the body adjacent thereto being formed relatively to define an engaging surface, the mounting for such keeper being loosely made to permit such parts to engage.

10. A logging hook comprising a hollow body defining a plurality of interiorly-arranged chambers each adapted to engage and house the knob-like end of a cable, one end of each of such chambers defining a seat for such cable end and the other end defining a laterally arranged entrance aperture spaced from such seat, such entrance aperture connecting the interior chamber with the exterior of such body, a restricted longitudinal slot leading from each of such apertures to such seat and proportioned to pass the cable but to retain the knob-like end thereof, an interiorly-arranged keeper arranged movably and centrally in said body and opposing the seat therein, such keeper spanning all of said interior chambers, yieldable means engaging said keeper and tending to hold the latter centrally in such chamber.

11. A logging hook comprising a hollow body defining a plurality of interiorly-arranged chambers each adapted to engage and house the knob-like end of a cable, one end of each of such chambers defining a seat for such cable end and the other end defining a laterally-arranged entrace aperture spaced from such seat, such entrance aperture connecting the interior chamber with the exterior of such body, a restricted longitudinal slot leading from each of such apertures to such seat and proportioned to pass the cable but to retain the knob-like end thereof, a stop located in the upper part of each of such chambers, an interiorly-arranged pivotally-mounted keeper arranged centrally in said body and opposing the seat therein, such keeper spanning all of said interior chambers, yieldable means engaging said keeper and tending to hold the latter against such stop.

In testimony whereof he has affixed his signature.

JOSEPH NADEAU.